(12) United States Patent
Sharma (10) Patent No.: US 6,683,309 B2
(45) Date of Patent: Jan. 27, 2004

(54) RADIATION DETECTOR USING POLYMER-DISPERSED LIQUID CRYSTAL CELL

(75) Inventor: Suresh C. Sharma, Arlington, TX (US)

(73) Assignee: Board of Regents, The University of Texas System, Austin, TX (US)

(*) Notice: Subject to any disclaimer, the term of this patent is extended or adjusted under 35 U.S.C. 154(b) by 0 days.

(21) Appl. No.: 10/028,353

(22) Filed: Dec. 21, 2001

(65) Prior Publication Data

US 2002/0085130 A1 Jul. 4, 2002

Related U.S. Application Data

(60) Provisional application No. 60/258,720, filed on Dec. 29, 2000.

(51) Int. Cl.[7] .................................................. G01J 1/00
(52) U.S. Cl. .................................. 250/336.1; 250/474.1
(58) Field of Search .......................... 250/336.1, 474.1, 250/472.1, 473.1

(56) References Cited

U.S. PATENT DOCUMENTS

| | | | | |
|---|---|---|---|---|
| 4,595,292 A | * | 6/1986 | Amodeo et al. ............. 356/454 |
| 5,272,348 A | * | 12/1993 | Miller ..................... 250/484.2 |
| 5,698,343 A | * | 12/1997 | Sutherland et al. ......... 250/484.2 |
| 6,306,469 B1 | | 10/2001 | Serbutoviez et al. ......... 428/1.1 |

FOREIGN PATENT DOCUMENTS

| | | | |
|---|---|---|---|
| WO | WO 01/22505 A | * | 3/2001 |
| WO | WO 02/054143 A1 | * | 7/2002 |

OTHER PUBLICATIONS

Jain, SC, Rout, DK, Chandra, S. *Electro–Optic Studies on Polymer Dispersed Liquid Crystal Films Prepared by Solvent–Induced Phase Separation Techniques.* Mol Crys Liq Cryst 1990, vol. 188. pp. 251–259.

* cited by examiner

Primary Examiner—Diego Gutierrez
Assistant Examiner—Tania C. Courson
(74) Attorney, Agent, or Firm—Gardere Wynne Sewell LLP (57) ABSTRACT

Generally, and in one form, the present invention is a device for the measurement of radiant energy using a polymer dispersed liquid crystal cell. In another form, the present invention is a device for the detection of ionizing radiation that uses a polymer dispersed liquid crystal cell and a light source that is optically oriented toward the cell. The cell is connected to an electrical signal generator, and a light detector capable of producing output is optically aligned with the light source. Finally, a computer is connected to the light detector to analyze the output from the light detector.

20 Claims, 5 Drawing Sheets

RADIATION DETECTOR USING POLYMER-DISPERSED LIQUID CRYSTAL CELL

This application claims priority from Provisional Patent Application Ser. No. 60/258,720, filed Dec. 29, 2000.

The U.S. Government may own certain rights in this invention pursuant to the terms of National Science Foundation grant INT-9610578.

TECHNICAL FIELD OF THE INVENTION

The present invention relates to radiation detectors, and more specifically to radiation detectors that use a polymer dispersed liquid crystal cell.

BACKGROUND OF THE INVENTION

Present radiation-detection technology is based on the fact that ionizing radiation, as it passes through matter, creates electrical charges. These electrical charges can be collected by applying an electrical field to the matter such that an electrical signal is derived. The type of detector chosen will depend upon the nature of the radiation, e.g. neutral versus charged particles, and the desired objective, e.g. the timing between events or the energy of a given event. For example, thalium activated sodium iodide single crystals are suitable for the measurement of low energy gamma-rays with low energy resolution, although it has poor timing measurement characteristics. For high energy-resolution measurements, a solid state single-crystal detector such as pure germanium can be used.

Currently available single crystal detectors must be kept at low temperatures during operation, e.g. 77K, which makes the use of cryogenic materials a necessity. Geiger-Muller type devices work at room temperature, but their applicability is limited. None of these radiation detectors are sufficiently flexible in size or shape. Film-badge type radiation detectors indicate exposure integrated over time, without providing any information about the energy of the incident radiation.

For these and other reasons, there is a need for a radiation detector that operates at ambient temperature and can be built simply and economically in a variety of sizes and shapes in order to accommodate different measuring methodologies.

SUMMARY OF THE INVENTION

Generally, and in one form, the present invention is a device for the measurement of radiant energy using a polymer dispersed liquid crystal cell.

In another form, the present invention is a device for the detection of ionizing radiation that uses a polymer dispersed liquid crystal cell and a light source that is optically oriented toward the cell. The cell is connected to an electrical signal generator, and a light detector capable of producing output is optically aligned with the light source. Finally, a computer is connected to the light detector to analyze the output from the light detector.

In yet another form, the present invention is a system of devices for the detection of ionizing radiation composed of two or more detection assemblies. Each assembly is made up of a polymer dispersed liquid crystal cell, a light source that is optically oriented toward the cell, an electrical signal generator that is connected to the cell, a light source that is capable of generating output that is optically aligned with the light source, and a computer that is connected to the light detector to analyze the output of the light detector.

In still another form, the present invention is a method for detecting ionizing radiation that includes the steps of creating a polymer dispersed liquid crystal cell, optically orienting a light source toward the cell, connecting the cell to an electrical signal generator, optically aligning a light detector capable of producing output with the light source, and attaching a computer to the light detector to analyze the output of the light detector.

Other features and advantages of the present invention shall be apparent to those of ordinary skill in the art upon reference to the following detailed description taken in conjunction with the accompanying drawings.

BRIEF DESCRIPTION OF THE DRAWINGS

The above and further advantages of the invention may be better understood by referring to the following description in conjunction with the accompanying drawings in which corresponding numerals in the different figures refer to corresponding parts in which.

DETAILED DESCRIPTION OF THE INVENTION

While making and using various embodiments of the present invention are discussed herein in terms of polymer dispersed liquid crystal radiation detectors, it should be appreciated that the present invention provides many applicable inventive concepts that can be embodied in a wide variety of specific contexts. The specific embodiments discussed herein are merely illustrative of specific ways to make and use the invention, and do not limit the scope of the invention.

Polymer-dispersed liquid crystal (hereinafter PDLC) films constitute an important class of materials with applications in electrically switchable optical devices. A PDLC film comprises sub-micron to micron-sized droplets of liquid-crystalline (lc) material dispersed in an optically transparent polymer matrix. The optical transmission through a PDLC-based device depends on several important parameters. These parameters include the local electric field inside each droplet (which depends upon the dielectric properties of the lc and polymer and charge-accumulation/dissipation at the lc-polymer interface), molecular director reorientation in each droplet, and the geometry and reorientation of the droplet itself. The device may also comprise a distribution of the sizes and shapes of the droplets. In the absence of an electric field and depending upon a critical radius of spherical droplets, more than one possible configuration of molecular orientations are possible within a droplet. Additionally, the directors of individual droplets are randomly oriented. All of this results in strong scattering of light.

When an electric field is applied, a change may occur in the configurations of the molecular directors in the droplet, orientation of the droplet's symmetry axis, and alignment of the director of the droplet. For positive dielectric anisotropy ($\Delta\epsilon>0$), the molecular director and the droplet's symmetry axis tend to align along the field and transmission through the film increases. The composite nature of the PDLC and the dielectric anisotropy of the liquid crystal make the effective electric field "seen" by the lc dipoles very different from externally applied field.

One example of a PDLC cell in accordance with the present invention contains liquid crystalline material, E8 in poly (methyl methacrylate) polymer [hereinafter PMMA]. Micron-sized droplets of E8 were dispersed in PMMA polymer matrix by using solvent-induced phase separation technique. A cell was constructed by sandwiching this composite material between two ITO-coated glass substrates separated by 20-$\mu$m thick insulators. The average size of the LC droplets ($\leq 1$ $\mu$m) was controlled by the cooling rate of the liquid crystal from its isotropic phase. The time dependence of the response of the cells was measured by a standard optical transmission measurement system using a He-Ne laser, a set of polarizers, a photomultiplier-detector, a square wave electrical pulse generator, and computer-controlled data collection and analysis software operating at 20 kHz.

Figure 1:
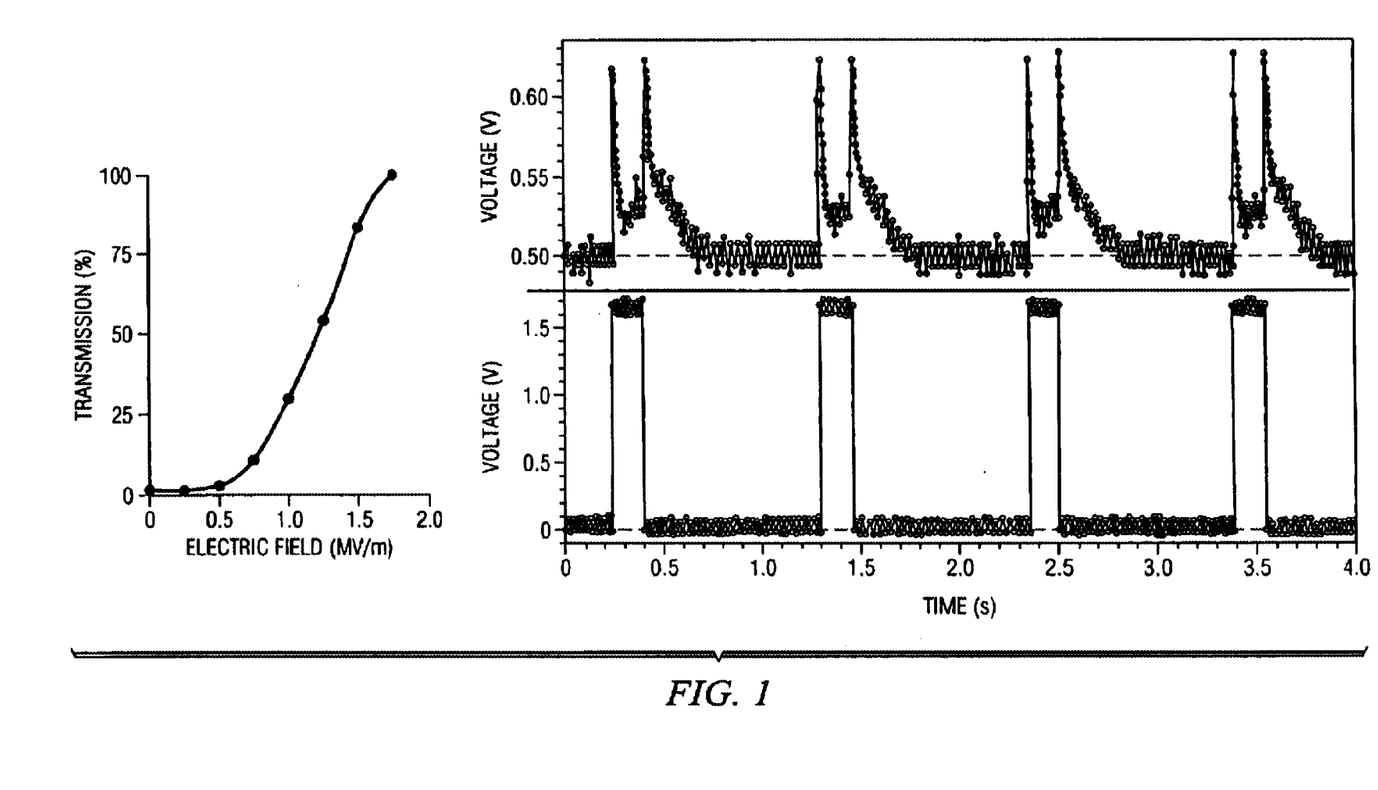
FIG. 1 depicts light transmission through a PDLC cell and its response following the application of square wave pulses, wherein the upper portion of the figure shows data taken as a function of the electrical field at a constant frequency of 1 kHz and the lower portion of the figure shows data collected for 1 kHz square wave pulses of fixed amplitude, giving 1 Mv/m.

FIG. 1 depicts the light transmission through the PDLC cell and its response, following application of square wave pulses. Square wave electrical pulses were applied so as to produce a constant electric field of 1 MV/m at repetition rates ranging from 0.5 to 20 Hz. Upon application of a pulse, transmission through the cell rises rapidly to a maximum (almost sudden increase in transmission occurs whenever $|dE/dt|>0$) and then decays via exponentials during the width of the pulse. The rise in transmission occurs with a rise-time of the order of 2 to 5 ms and represents rapid alignment of the molecular director within the droplets. Additionally, a realignment of the director of the droplet along the field may also contribute. This is a relatively slow process and it is not expected to contribute significantly to the rapid switch-on of the cell. The applied electric field should also generate charges in the polymer matrix. The diffusion of these charges through the composite material of the PDLC leading to charge accumulation at the droplet-polymer interface, may add to the time dependence of the cell response.

Additionally, from the electrical point of view, a certain time constant can be assigned to the PDLC cell, which can be viewed as a circuit element with a complex impedance, $Z_d=Z_{el}+Z_p$. Here $Z_{el}$ is the electrode impedance containing electrical response at the interface between the PDLC film and the electrodes and $Z_p$ is the impedance in the bulk of the PDLC film. $Z_{el}$ represents charge transfer at the droplet/polymer interface, interfacial capacitance resulting from ion buildup at the electrodes, and ITO resistance. The impedance $Z_p$ results from the two-phase structure of the PDLC film. The theoretical model (discussed below) predicts exponential decay with the same decay time within and outside the applied pulse. Measurements in accordance with the present invention, however, show that a single exponential cannot describe the cell response and the decay times of the cell response, within and outside the applied pulse, are not the same. Furthermore, the present invention provides a new feature in the cell response; a delayed component.

After the initial rise and while decaying rapidly during the pulse, the cell response exhibits an increase in transmission followed by resumption of the exponential decay during the remaining width of the applied pulse. Similar behavior is observed even outside the width of the applied pulse, albeit, with significantly different decay times. The cell response can be decomposed into two components that provide a better understanding of the result. The early part of the cell response is well represented by an exponential and a constant background. The results of this fit are then subtracted from the total response and the difference curve is labeled as the delayed component. The cell responses, for both within and outside the width of the applied pulse, can be analyzed by following this procedure.

Figure 2:
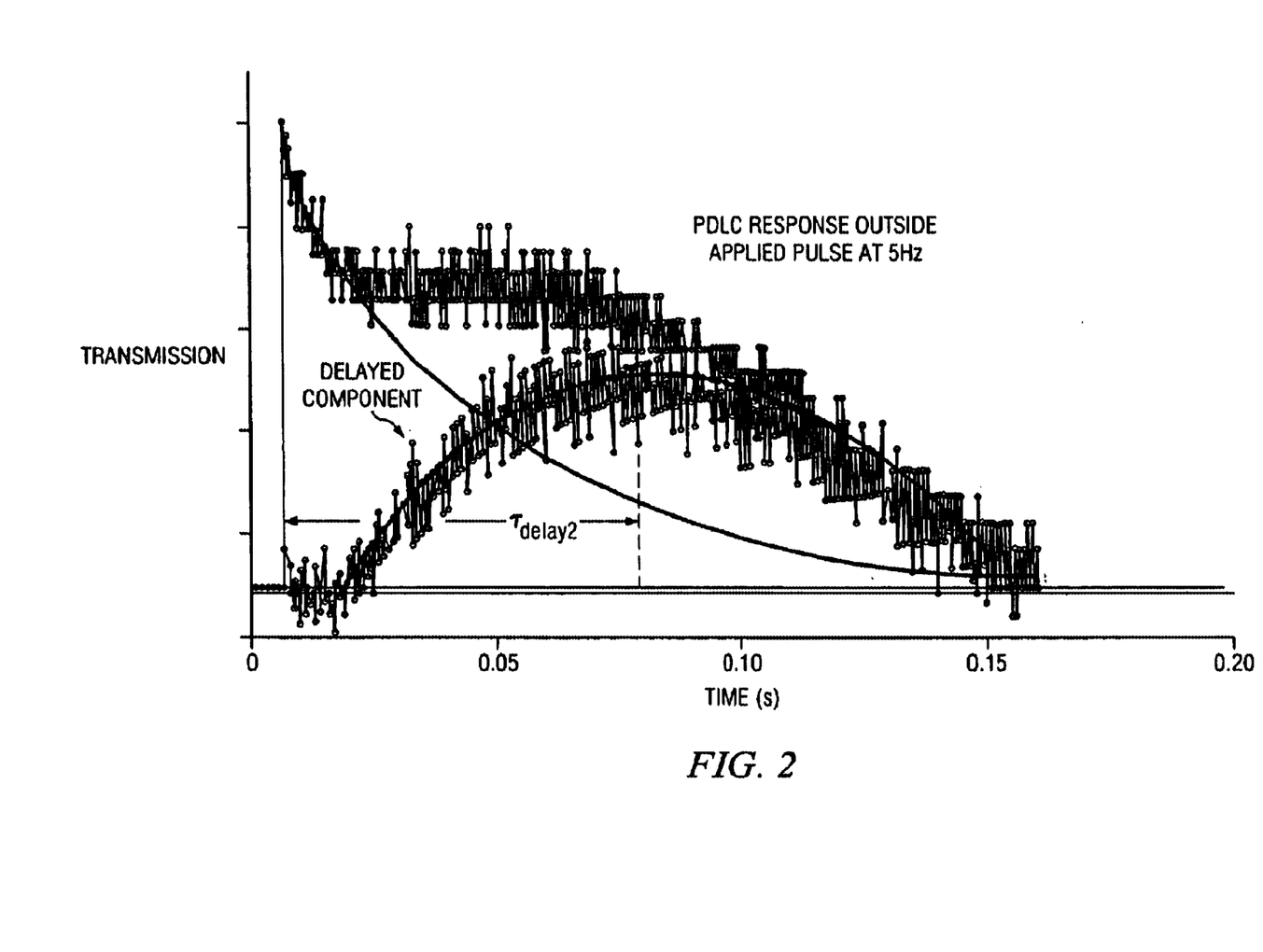
FIG. 2 is a plot of transmission of light through a PDLC cell as a function of time following the application of a square pulse.

The measured cell response is much more complex than a single exponential decay. Following a rapid rise, the cell response decays exponentially with a decay time, $\tau_{decay1}^{off}=$ (30±2) ms. Simultaneously, the delayed component builds up with a rise time, $\tau_r^{off}=(24\pm1)$ ms. Having reached a maximum at $t=\tau_{delay2}$, the delayed component decays with a decay time, $\tau_{decay2}^{off}=(40\pm2)$ ms. In the case of the 5 Hz data, $\tau_{delay1}\sim10$ ms and $\tau_{delay2}\sim50$ ms, as shown in FIG. 2.

As far as the physical process responsible for the delayed component is concerned, there are two possible effects. These are: 1) realignment of the director of the non-spherical droplets and 2) change in the electric field $|dE/dt|$ due to accumulation of sufficient charges at the droplet/polymer interface. The values of the time-delays, $\tau_{delay1}\sim10$ ms within the width of the applied pulse and $\tau_{delay2}\sim50$ ms outside the width of the applied pulse, are two important parameters. The time-delay represents an average time needed for either the reorientation of the symmetry axis of non-spherical droplets along the applied field or buildup of sufficient charges at the lc-polymer interface. The latter involves several different processes, ie, generation of charges in the polymer matrix, diffusion of these charges under the influence of the applied field, and their equilibrium arrangement at the lc-polymer interface. An interplay between the decay rate $\tau$ and delay time $\tau_{delay}$ sets a limit on the repetition rate of the applied electric field pulse ($=\tau_{delay}^{-1}$) above which the delayed component is not expected to be observed. In the case of the E8-PDLC, the upper limit on the repetition rate turns out to be 100 Hz. No delayed component if observed for repetition rates higher than 20 Hz.

Several processes contribute to the cell response; dielectric properties of the lc droplets, charge accumulation/dissipation at the lc-polymer interface, reorientation and dynamics of non-spherical droplets, etc. The dielectric response of a film consisting of spheroidal inclusions of type 1 material (liquid crystal droplets) randomly distributed in a matrix of type 2 material (polymer) has been modeled by $$\epsilon=\epsilon_2+3v_1[\epsilon_2(\epsilon_1-\epsilon_2)/\{\epsilon_1+2\epsilon_2-v_1(\epsilon_1-\epsilon_2)\}], \tag{1}$$

where $v_1$ is the volume fraction of type 1 material, and $\epsilon_1$ and $\epsilon_2$ are the dielectric constants of the isotropic phases of the two materials in the film. The dielectric constants are assumed to be complex to account for the dissipative mechanisms.

The main points of the theoretical model that are relevant are as follows. At low frequencies of the applied field and when the conductivity of the lc is much greater than the conductivity of the polymer (which is appropriate to the E8-PMMA PDLC), there can be significant accumulation of charges at the lc-polymer interface. Thus the field "seen" by a droplet can be significantly different from the applied field due to the shielding effects. At higher frequencies there is hardly any charge accumulation at the lc-polymer interface. The PDLC conductivity is then governed by the liquid crystal conductivity. For a square voltage pulse of amplitude $V_0$ and duration $t_0$, applied at t=0, this model provides the following equations for the field inside a droplet ($E_{in}$), $$E_{in}=0: \text{ for } t<0$$

$$E_{in}(t)=E_0+(E_\infty-E_0)\exp(-t/\tau), \text{ for } 0<t<t_0,$$

$$E_{in}(t)=-2(E_\infty-E_0)\sinh(t_0/\tau)\exp(-(t-t_0)/\tau), \text{ for } t_0<t, \quad (2)$$

where $E_0$ and $E_\infty$ are electric fields at low and high frequencies, respectively. Whereas, the model predicts one decay rate for both $0<t<t_0$, and $t_0<t$, the data shows that the response for the E8-PDLC cell is much more complex than a single exponential decay.

Theoretical considerations of additional processes may provide more realistic description of the measurements. For example, eq (2) is derived by assuming that the lc droplets are spherical in shape. The PDLC probably contains a distribution of sizes and shapes of the lc droplets. This is supported by the scanning electron micrographs of the E8-PMMA PDLC. This feature alone adds to complexity; the response of relatively small and highly anisotropic droplets to applied fields could be very different from the response of large and spherical droplets. With a distribution of sizes and shapes of lc droplets, it is reasonable to expect that more than one relaxation-mechanism is operational in the cell. Furthermore, the dynamics of the interfacial charges, both during and after the applied pulse, will have to be taken into consideration. For an elongated droplet of semi-major and semi-minor axes a and b, respectively, the relaxation times are given by, $$\tau_{on}^{-1}=(1/\gamma_1)[\Delta\epsilon E^2+\{K(1^2-1)(1-\tan^2\lambda_2)/(a^2(1+\tan^2\lambda_2)\}\{(1+\tan^2\lambda_1)/(1-\tan^2\lambda_1)\}$$

$$\tau_{off}=\gamma_1 a^2/\{K(1^2-1), \quad (3)$$

where $\gamma_1$ is the rotational viscosity, $\Delta\epsilon$ is the dielectric anisotropy, E is the electric field, K is an effective deformation constant, 1=a/b is the aspect ratio for the droplet, and $\lambda_1$ and $\lambda_2$ are two angles such that when the electric field is removed, the droplet director returns from an angle $\lambda_1$ to $\lambda_2$. These equations clearly show the effect of the non-spherical shape of the droplet on the relaxation times involved. It is interesting to note that for reasonable values of the parameters and slightly elongated droplets (aspect ratio, l=1.1), these equations provide values of the relaxation times that are in good agreement with our measurements of $\tau_{on}$ ~25 ms and $\tau_{delay2}$~50 ms.

It is expected that the accumulation/dissipation of charges at the lc-polymer interface depend largely on the polymer matrix in a PDLC cell. It is possible to intentionally generate additional charges in the polymer matrix and observe their influence on the response of a PDLC cell constructed with NF-100 lc material. For this purpose, the cell is irradiated with gamma rays using ~5 $\mu$Ci $^{207}$Bi radioactive source. This radioisotope produces gamma rays of energies 0.57 and 1.06 MeV. The absorption of the gamma rays in the polymer of the PDLC cell, albeit relatively small, produces additional charges. The cell response has been measured as a function of time prior to, and following gamma irradiation.

Figure 3:
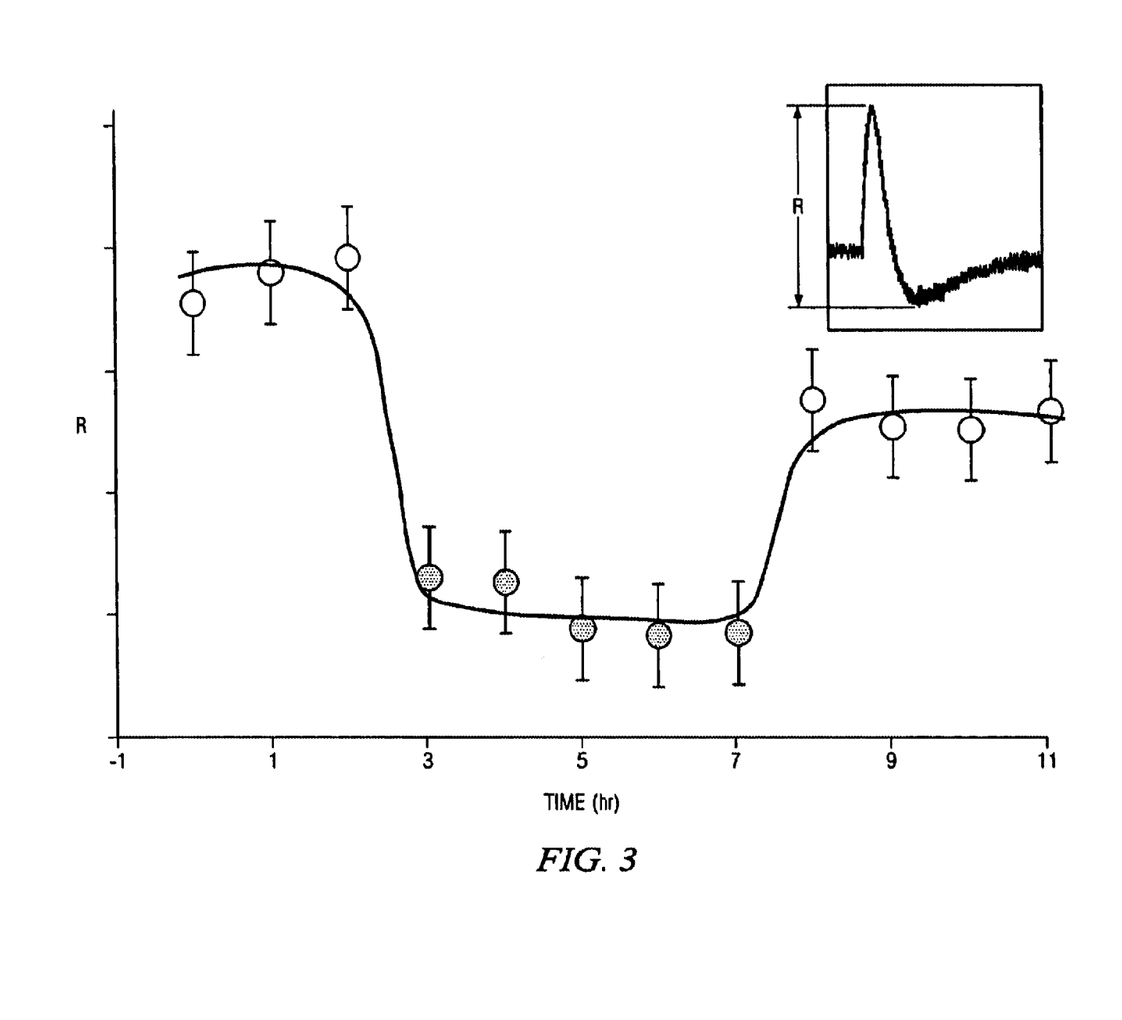
FIG. 3 is a plot of the shape function (R) as a function of irradiation time.

A characteristic shape parameter (R) of the cell response as a function of irradiation time is shown in FIG. 3. Prior to irradiation, R remains time-independent within the statistical uncertainties of the measurements. After irradiation for a period of an hour, we observe a significant reduction in R. This decrease is attributed to the generation of additional charges in the PDLC. Diffusion of these additional charges, leading to their accumulation at the lc-polymer interface, reduces the effective electric field experienced by the molecular dipoles. This results in a reduction of transmission through the cell and a lower value of R. Thereafter R remains at this lower value during further irradiation for about 4 hrs. After irradiation for a total of 5 hrs, the radioactive source was removed and the cell response was measured after a "cooling-off" period of 1 hr. The resulting value of R (at time=8 hrs) has returned close to its pre-irradiation level. The measurements of R made for additional 3 hrs without irradiation remain constant at this high value. The latter is close to the value of R measured prior to irradiation. Whereas the drop in R (at time=3 hrs) results from additional charges at the lc-polymer interface, the rise in R at time=8 hrs is due to dissipation of these charges under the influence of the applied field. The data demonstrate the influence of additional charges on light transmission (hence on the local electric field "seen" by molecular dipoles) in a PDLC cell. The magnitude of the effect should depend on the charges produced in the polymer matrix, diffusion of charges through the matrix, and their equilibrium accumulation at and dissipation from the interface.

The present invention makes use of PDLC films synthesized from two different different polymers, namely, poly (methyl methacrylate (PMMA) and poly (vinyl chloride; vinyl acetate-17%) (PVA:VAC-17), obtained from M/s Polysciences Inc., USA and liquid crystal mixture, E-8 from M/s B.D.H. England. The polymers PMMA and PVC:VAC-17 have the refractive index, $n_p$=1.49 and 1.52 respectively at room temperature (23° C.), which is very close the refractive index, $n_o$, of the liquid crystal mixture, E-8 ($n_o$=1.52 at 23° C). Each polymer has low solubility of the liquid crystal mixture. The PDLC films were prepared using the solvent induced phase separation technique. Appropriate quantities of the liquid crystal mixture and of the polymer were dissolved in a common solvent (chloroform/acetone) in various weight proportions. The homogeneous solution of each concentration was spread in the form of a film in a suitable cast. On solvent evaporation a strongly scattering white film was obtained. The thickness of the prepared film was measured by a Surfometer SF-200 (M/s Planer industrial, UK). Films of various thicknesses ranging from 10–50 $\mu$m were prepared. The PDLC film was peeled-off from the substrate and was sandwiched between two transparent conducting glass plates under simultaneous application of heat and pressure.

The scattering and electro-optic characteristics of the PDLC films depended strongly on the thermal history of the films. The electro-opic transmission properties were measured by a simple set-up in a normal transmission geometry using a He-Ne laser light source ($\lambda$=632.8 nm) along with a RCA-931A photomultiplier tube. The temperature of the cell was controlled by a water circulator (Julabo HC-40, W. Germany) to an accuracy of ±0.1° C. The refractive index measurements were carried out using an Abbe refractometer. It was ensured that the polymer films were completely solvent-free before making the refractive index measurements.

Figure 4:
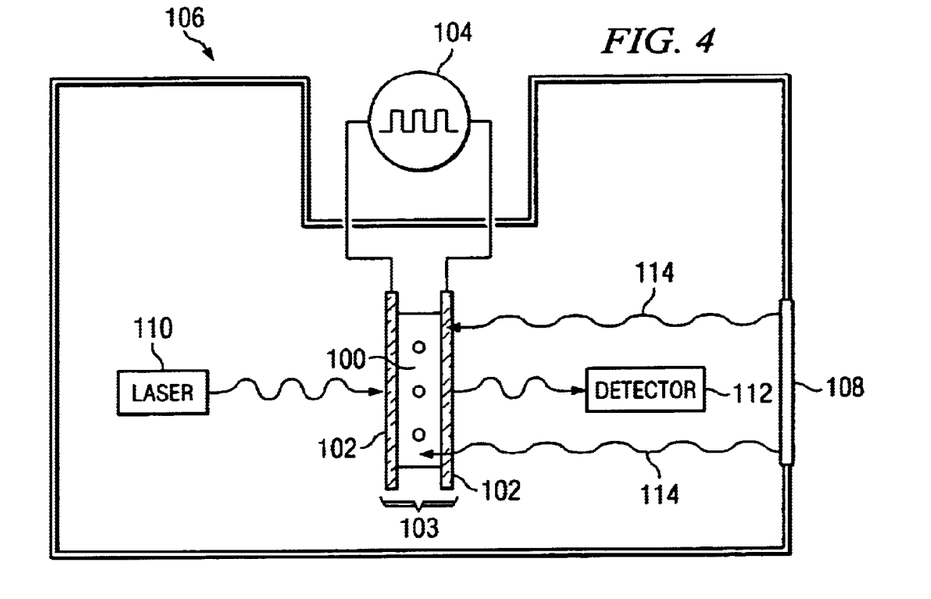
FIG. 4 is a schematic diagram of one form of a device for detecting radiation in accordance with the present invention.
Figure 5:
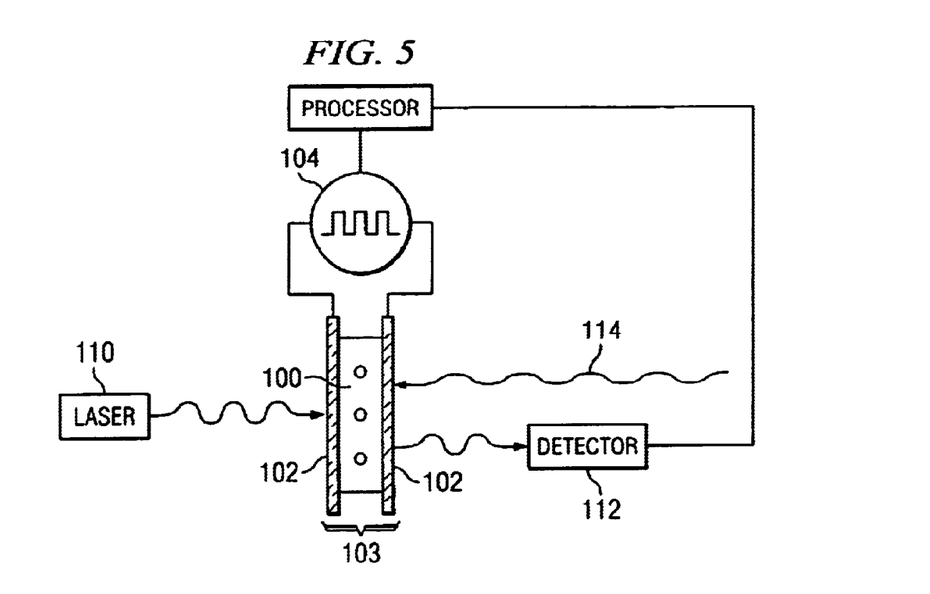
FIG. 5 depicts an apparatus in accordance with the present invention.
Figure 6:
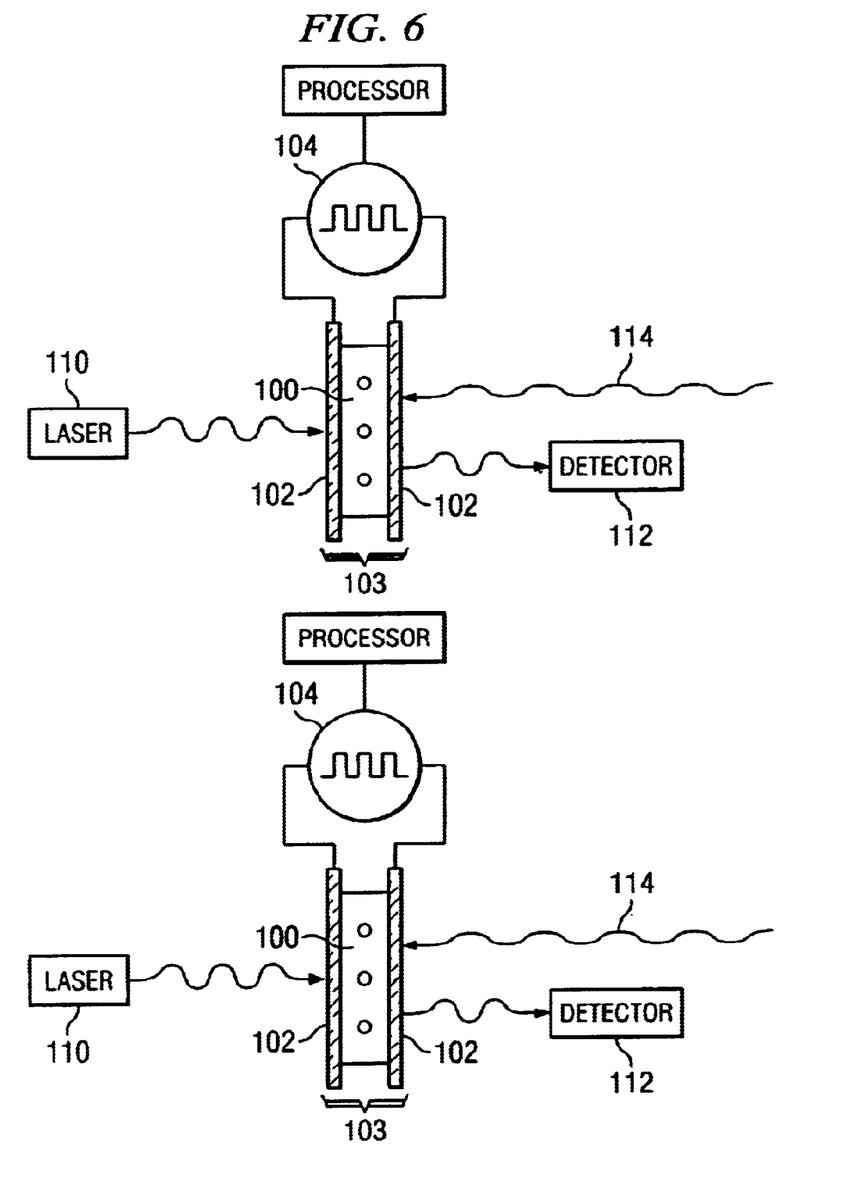
FIG. 6 depicts two or more detection assemblies in accordance with the present invention.

FIG. 4 shows one form of the present invention. The PDLC 100 is shown between two windows 102 and together they form a PDLC cell 103. The only limitation on the window material is that it be substantially transparent to the wavelength of the light source 110 (vide infra). An electrical signal generator 104 is connected to the cell 103 to provide a constant electrical field to the cell 103. The waveform generated by the electrical signal generator can be any alternating current waveform, with nonlimiting examples being square and sinusoidal waves. The cell 103 is housed in a light-tight box 106 that is fitted with an aperture 108. Also contained within the light-tight box 106 are a light source 110 and a light detector 112. The light source 110 and light detector 112 can be any of variety of specific components that are known to those of skill in the art. Nonlimiting examples of light sources 110 include both broadband and monochromatic lamps and lasers. Similarly, the light detector 112 can be chosen for the specific application that is envisioned. It can be a silicon photo detector, an array detector or a photomultiplier tube. The light source 110 is oriented so that it points to the cell 103 from one side while the light detector 112 is positioned on the opposite side. The application of the signal from the electrical signal generator orients the liquid crystal to produce a base level of transmission of light from the light source 110 to the light detector 112.

Incident photons 114 of ionizing radiation can then impinge on the cell. The photons generate charges locally in the PDLC and thus alter the electrical field that is seen by the liquid crystals dispersed near the site where the charge is created. This change in the electrical field is reflected in a change in the orientation of the liquid crystals and/or the droplets and thus the amount of light that is transmitted through the cell form the light source to the light detector changes. It is the measurement of this change through the parameter R that constitutes the detection of the incident photon.

While specific alternatives to steps of the invention have been described herein, additional alternatives not specifically disclosed but known in the art are intended to fall within the scope of the invention. Thus, it is understood that other applications of the present invention will be apparent to those skilled in the art upon reading the described embodiment and after consideration of the appended claims and drawing.

What is claimed is:

1. A device for detecting ionizing radiant energy comprising:

a polymer dispersed liquid crystal cell that interacts with the radiant energy such that the transmissibility of the polymer dispersed liquid crystal cell is changed by the interaction with the radiant energy.

2. The device for detecting ionizing radiant energy recited in claim 1, wherein the polymer dispersed liquid crystal cell is comprised of poly (methyl methacrylate) and liquid crystal E-8.

3. The device for detecting ionizing radiant energy recited in claim 1, wherein the polymer dispersed liquid crystal cell is comprised of poly (vinyl chloride: vinyl acetate-17%) and liquid crystal E-8.

4. The device for detecting ionizing radiant energy recited in claim 1, wherein the polymer dispersed liquid crystal cell is comprised of poly (methyl methacrylate) and a cholesteric liquid crystal.

5. The device for detecting ionizing radiant energy recited in claim 1, wherein the polymer dispersed liquid crystal cell is comprised of poly (vinyl chloride: vinyl acetate-17%) and a cholesteric liquid crystal.

6. The device for detecting ionizing radiant energy recited in claim 1, wherein the polymer dispersed liquid crystal cell has a refractive index of between about 1.49 and 1.52.

7. A device for detecting ionizing radiant energy comprising:

a polymer dispersed liquid crystal cell;
   a light source that is optically oriented toward the cell;
   an electrical signal generator that is connected to the cell;
   a light detector optically aligned with the light source that is capable of generating output; and
   a processor that is connected to the electrical signal generator and analyzes the output from the light detector, wherein the polymer dispersed liquid crystal cell interacts with the ionizing radiant energy such that the transmissibility of the polymer dispersed liquid crystal cell is changed.

8. The device for detecting ionizing radiant energy recited in claim 2, wherein the device is housed in a light-tight box with an aperture.

9. The device for detecting ionizing radiant energy recited in claim 2, wherein the electrical signal generator produces an alternating current waveform.

10. The device for detecting ionizing radiant energy recited in claim 2, wherein the electrical signal generator produces a square waveform.

11. The device for detecting ionizing radiant energy recited in claim 2, wherein the electrical signal generator produces a sinusoidal waveform.

12. The device for detecting ionizing radiant energy recited in claim 2, wherein the frequency of the waveform generated by the electrical signal generator is between about 0.5 Hz and about 20 Hz.

13. The device for detecting ionizing radiant energy recited in claim 2, wherein the light detector is silicon photo detector.

14. The device for detecting ionizing radiant energy recited in claim 2, wherein the light detector is a photomultiplier tube.

15. The device for detecting ionizing radiant energy recited in claim 2, wherein the light detector is a photo array detector.

16. The device for detecting ionizing radiant energy recited in claim 2, wherein the light source is monochromatic.

17. The device for detecting ionizing radiant energy recited in claim 2 wherein, the light source is a laser.

18. The device for detecting ionizing radiant energy recited in claim 2, wherein the light source has a wavelength of about 633 nm.

19. A system of devices for detecting ionizing radiation comprising two or more detection assemblies;

each detection assembly comprising:
   a polymer dispersed liquid crystal cell;
   a light source that is optically oriented toward the cell;
   an electrical signal generator that is connected to the cell;
   a light detector optically aligned with the light source that is capable of generating output; and
   a processor that is connected to the light detector and analyzes the output from the light detector, wherein the polymer dispersed liquid crystal cell interacts with ionizing radiation such that the transmissibility of the polymer dispersed liquid crystal cell is changed by the interaction with the ionizing radiation.

20. A method for detecting ionizing radiation comprising a polymer dispersed liquid crystal cell, a light source, an electrical signal generator, a light detector, and a processor, the method comprising the steps of:

obtaining the polymer dispersed liquid crystal cell;
   optically orienting the light source toward the polymer dispersed liquid crystal cell;

connecting the electrical signal generator to the polymer dispersed liquid crystal cell and generating a signal;

optically aligning the light detector capable of generating output, with the light source; and attaching the processor to the light detector to analyze the output of the light detector, wherein the polymer dispersed liquid crystal cell interacts with the ionizing radiation such that the transmissibility of the polymer dispersed liquid crystal cell is changed by the interaction with the ionizing radiation.

* * * * *